United States Patent
Hanko et al.

(10) Patent No.: US 7,502,470 B2
(45) Date of Patent: Mar. 10, 2009

(54) METHOD AND APPARATUS FOR CONTENT PROTECTION WITHIN AN OPEN ARCHITECTURE SYSTEM

(75) Inventors: James G. Hanko, Redwood City, CA (US); Michael G. Lavelle, Saratoga, CA (US); James D. Lyle, Santa Clara, CA (US); J. Duane Northcutt, Menlo Park, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 730 days.

(21) Appl. No.: 10/679,055

(22) Filed: Oct. 3, 2003

(65) Prior Publication Data

US 2008/0148063 A1 Jun. 19, 2008

Related U.S. Application Data

(60) Provisional application No. 60/439,903, filed on Jan. 13, 2003.

(51) Int. Cl.
 *H04N 7/16* (2006.01)
(52) U.S. Cl. .................. 380/200; 380/217
(58) Field of Classification Search .......... 713/165, 713/162; 380/200, 217, 239, 241
See application file for complete search history.

(56) References Cited

U.S. PATENT DOCUMENTS

| | | | |
|---|---|---|---|
| 6,389,538 B1 | 5/2002 | Gruse et al. | |
| 6,574,609 B1 * | 6/2003 | Downs et al. | 705/50 |
| 6,834,110 B1 | 12/2004 | Marconcini et al. | |
| 6,904,522 B1 | 6/2005 | Benardeau | |
| 7,046,805 B2 | 5/2006 | Fitzhardinge et al. | |
| 7,055,038 B2 * | 5/2006 | Porter et al. | 713/193 |
| 2002/0136406 A1 | 9/2002 | Fitzhardinge et al. | |
| 2002/0150248 A1 | 10/2002 | Kovacevic | |
| 2003/0145336 A1 * | 7/2003 | Matsuzaki et al. | 725/136 |
| 2003/0156218 A1 * | 8/2003 | Laksono | 348/388.1 |
| 2003/0236978 A1 | 12/2003 | Evans et al. | |

(Continued)

OTHER PUBLICATIONS

IBM Response to DVB-CPT Call for Proposals for Content Protection & Copy Management: xCP Cluster Protocol, Published Oct. 19, 2001.*

(Continued)

*Primary Examiner*—Ellen Tran
(74) *Attorney, Agent, or Firm*—Blakley, Sokoloff, Taylor & Zafman

(57) ABSTRACT

In a class of embodiments, the invention is an open computing system (e.g., a PC) in which a protected, closed subsystem is embedded. The closed subsystem typically includes multiple parts that ensure that content protection keys and protected content are never revealed outside the closed subsystem. Content (e.g., high-definition digital video) that enters the closed subsystem (and is typically decrypted and re-encrypted within the closed subsystem) is afforded a similar level of protection within the open system as can be obtained in standalone closed systems. Other aspects of the invention are methods for protecting content within an open computing system, a closed system (or disk drive thereof) configured to be embedded in an open computing system, and circuitry configured to be embedded in an open computing system for combining the output of a closed subsystem with other output (e.g., graphics and/or audio output) of the open computing system.

33 Claims, 8 Drawing Sheets

U.S. PATENT DOCUMENTS

2004/0064694 A1* 4/2004 Lee et al. .................... 713/168

OTHER PUBLICATIONS

*High-Bandwidth Digital Content Protection System*, Revision 1.0, by Intel Corporation, Feb. 17, 2000, pp. 1-60.

*High-Bandwith Digital Content Protection System Revision 1.0 Erratum*, by Intel Corporation, Mar. 19, 2001, pp. 1-9.

*Upstream Link for High-bandwidth Digital Content Protection*, Revision 1.00, by Intel Corporation, Jan. 26, 2001, pp. 1-38.

APT Technologies, Inc., et al., "*Serial ATA: High Speed Serialized AT Attachment*", Revision 1.0, Aug. 29, 2001, pp. 1-306.

HDMI Licensing, LLC, "HDMI Download 1.0 Spec Adopter Agreement", p. 1, downloaded from the Internet on Dec. 24, 2002 from http://www/hdmi.com/download/download.asp.

HDMI Licensing, LLC, "*HDMI Founders Hitachi, Matsushita (Panasonic), Philips, Silicon Image, Sony, Thomson and Toshiba Release Final HDMI 1.0 Specification Admid Broad Industry Support*", pp. 1-2, downloaded from the Internet on Dec. 24, 2002 from http://www/hdmi.com/press/release_120909.asp.

"8029P030XC OA Mailed Jan. 10, 2008 for U.S. Appl. No. 11/803,051".

"PCT Search Report", International Search Report and Written Opinion; Application No. PCT/US05/37178; mailed Dec. 13, 2006; 12 pages.

CN PTO, "Office Action", CN PTO First Office Action mailed Jul. 4, 2008; CN Application No. 200580035237.2; 14 pages.

KR PTO, "Office Action", 8029P030XKR OA Mailed Jul. 30, 2008 for KR Patent Application 10-2007-7007140, (Jul. 30, 2008), Whole Document.

* cited by examiner

METHOD AND APPARATUS FOR CONTENT PROTECTION WITHIN AN OPEN ARCHITECTURE SYSTEM

CROSS-REFERENCE TO RELATED APPLICATION

This application claims the benefit of U.S. Provisional Application No. 60/439,903, filed Jan. 13, 2003, entitled "Method and Apparatus for Content Protection Within an Open Architecture System."

TECHNICAL FIELD OF THE INVENTION

The invention pertains to methods and apparatus for content protection within computing systems having open architecture (such as personal computers). Open architecture systems (sometimes referred to as open systems) are systems configured to allow end users to add or remove hardware components and/or software modules conveniently. A preferred embodiment of the invention is a personal computer (or other open system) in which a protected, closed subsystem is embedded. Encrypted content (e.g., high-definition digital video) that enters the closed subsystem is decrypted (and typically then decompressed or otherwise manipulated) and then re-encrypted within the closed subsystem so that re-encrypted content can be output from the closed subsystem.

BACKGROUND OF THE INVENTION

Modern Personal Computers (PCs) have evolved from strictly computing devices into communication and entertainment devices. As a result, users expect to be able to view prerecorded video entertainment, including feature length movies, on their PC. In addition, the increased performance of processors makes it look advantageous to use software on the PCs processor to, for example, decode and play DVD movies. However, the owners of entertainment intellectual property (e.g., copyrights in movies) rightly are concerned about unauthorized use and copying of their property.

Unfortunately, the very nature of software decode in an open system such as a PC means that content cannot be effectively protected in a conventional open system that decodes the content. At some point during the decode process, both the keys and the decrypted content (e.g., video content) are available within the registers and/or memory of the open system and unauthorized copies of the keys or content can made.

In accordance with the present invention, this problem is avoided by creating a "closed" subsystem within a PC (or other open system) which can protect both content (e.g., video and/or audio data) and keys. The expression "closed subsystem" herein denotes a subsystem that does not provide users a way to add hardware or software thereto or remove hardware or software therefrom. Similarly, the expression "closed system" herein denotes a system that does not provide users a way to add hardware or software thereto or remove hardware or software therefrom. In typical embodiments of the invention, a closed subsystem within a PC employs key data to encrypt content, and is designed to prevent the key data and the unencrypted content (the content in its pre-encrypted state) from being disclosed outside of the closed subsystem.

Standard DVDs provide protection of their content from unauthorized use via the Content Scrambling System ("CSS"), an encryption method. It is anticipated that high definition video will be disseminated as high definition DVDs (HD-DVDs), and that an encryption method similar to CSS will be used to protect the content of HD-DVDs.

The trend in the industry for sending high definition video to display devices is to deliver the data in digital form over serial links.

Various serial links for transmitting encrypted or non-encrypted data are well known. One conventional serial link, used primarily in consumer electronics (e.g., for high-speed transmission of video data from a set-top box to a television set) or for high-speed transmission of video data from a host processor (e.g., a personal computer) to a monitor, is known as a transition minimized differential signaling interface ("TMDS" link). The characteristics of a TMDS link include the following:

1. video data are encoded and then transmitted as encoded words (each 8-bit word of digital video data is converted to an encoded 10-bit word before transmission);
   a. the encoding determines a set of "in-band" words and a set of "out-of-band" words (the encoder can generate only "in-band" words in response to video data, although it can generate "out-of-band" words in response to control or sync signals. Each in-band word is an encoded word resulting from encoding of one input video data word. All words transmitted over the link that are not in-band words are "out-of-band" words);
   b. the encoding of video data is performed such that the in-band words are transition minimized (a sequence of in-band words has a reduced or minimized number of transitions);
   c. the encoding of video data is performed such that the in-band words are DC balanced (the encoding prevents each transmitted voltage waveform that is employed to transmit a sequence of in-band words from deviating by more than a predetermined threshold value from a reference potential. Specifically, the tenth bit of each "in-band" word indicates whether eight of the other nine bits thereof have been inverted during the encoding process to correct for an imbalance between running counts of ones and zeroes in the stream of previously encoded data bits);
2. the encoded video data and a video clock signal are transmitted as differential signals (the video clock and encoded video data are transmitted as differential signals over conductor pairs);
3. three conductor pairs are employed to transmit the encoded video, and a fourth conductor pair is employed to transmit the video clock signal; and
4. signal transmission occurs in one direction, from a transmitter (typically associated with a desktop or portable computer, or other host) to a receiver (typically an element of a monitor or other display device).

A use of the TMDS serial link is the "Digital Visual Interface" interface ("DVI" link) adopted by the Digital Display Working Group. A DVI link can be implemented to include two TMDS links (which share a common conductor pair for transmitting a video clock signal) or one TMDS link, as well as additional control lines between the transmitter and receiver. A DVI link includes a transmitter, a receiver, and the following conductors between the transmitter and receiver: four conductor pairs (Channel 0, Channel 1, and Channel 2 for video data, and Channel C for a video clock signal), Display Data Channel ("DDC") lines for bidirectional communication between the transmitter and a monitor associated with the receiver in accordance with the conventional Display Data Channel standard (the Video Electronics Standard Association's "Display Data Channel Standard," Version 2, Rev. 0, dated Apr. 9, 1996), a Hot Plug Detect (HPD) line (on which the monitor transmits a signal that enables a processor associated with the transmitter to identify the monitor's presence), Analog lines (for transmitting analog video to the receiver), and Power lines (for providing DC power to the receiver and a monitor associated with the receiver). The Display Data Channel standard specifies a protocol for bidirectional communication between a transmitter and a monitor associated with a receiver, including transmission by the monitor of an Extended Display Identification ("EDID") message that specifies various characteristics of the monitor, and transmission by the transmitter of control signals for the monitor.

Another serial link is the "High Definition Multimedia Interface" interface (sometimes referred to as an "HDMI" link or interface) developed Silicon Image, Inc., Matsushita Electric, Royal Philips Electronics, Sony Corporation, Thomson Multimedia, Toshiba Corporation, and Hitachi.

It has been proposed to use the cryptographic protocol known as the "High-bandwidth Digital Content Protection" ("HDCP") protocol to encrypt digital video to be transmitted over a DVI or HDMI link and to decrypt the data at the DVI (or HDMI) receiver. The HDCP protocol is described in the document "High-bandwidth Digital Content Protection System," Revision 1.0, dated Feb. 17, 2000, by Intel Corporation, and the document "High-bandwidth Digital Content Protection System Revision 1.0 Erratum," dated Mar. 19, 2001, by Intel Corporation. The full text of both of these documents is incorporated herein by reference.

A DVI-compliant (or HDMI-compliant) transmitter implementing the HDCP protocol asserts a stream of pseudo-randomly generated 24-bit words, known as cout[23:0], during each active period (i.e. when DE is high). In a DVI-compliant system, each active period is an active video period. In an HDMI-compliant system, each active period is a period in which video, audio, or other data are transmitted. Each 24-bit word of the cout data is "Exclusive Ored" (in logic circuitry in the transmitter) with a 24-bit word of RGB video data input to the transmitter, in order to encrypt the video data. The encrypted data are then encoded (according to the TMDS standard) for transmission. The same sequence of cout words is also generated in the receiver. After the encoded and encrypted data received at the receiver undergo TMDS decoding, the cout data are processed together with the decoded video in logic circuitry in order to decrypt the decoded data and recover the original input video data.

Before the transmitter begins to transmit HDCP encrypted, encoded video data, the transmitter and receiver communicate bidirectionally with each other to execute an authentication protocol (to verify that the receiver is authorized to receive protected content, and to establish shared secret values for use in encryption of input data and decryption of transmitted encrypted data). More specifically, each of the transmitter and the receiver is preprogrammed (e.g., at the factory) with a 40-bit word known as a key selection vector, and an array of forty 56-bit private keys. To initiate the first part of an authentication exchange between the transmitter and receiver, the transmitter asserts its key selection vector (known as "AKSV"), and a pseudo-randomly generated session value ("An") to the receiver. In response, the receiver sends its key selection vector (known as "BKSV") and a repeater bit (indicating whether the receiver is a repeater) to the transmitter, and the receiver also implements a predetermined algorithm using "AKSV" and the receiver's array of forty private keys to calculate a secret value ("Km"). In response to the value "BKSV" from the receiver, the transmitter implements the same algorithm using the value "BKSV" and the transmitter's array of forty private keys to calculate the same secret value ("Km") as does the receiver.

Each of the transmitter and the receiver then uses the shared value "Km," the session value "An," and the repeater bit to calculate a shared secret value (the session key "Ks"), a value ("R0") for use in determining whether the authentication is successful, and a value ("M0") for use during a second part of the authentication exchange. The second part of the authentication exchange is performed only if the repeater bit indicates that the receiver is a repeater, to determine whether the status of one or more downstream devices coupled to the repeater requires revocation of the receiver's authentication.

After the first part of the authentication exchange, and (if the second part of the authentication exchange is performed) if the receiver's key selection vector is not revoked as a result of the second part of the authentication exchange, each of the transmitter and the receiver generates a 56-bit frame key Ki (for initiating the encryption or decrypting a frame of video data), an initialization value Mi, and a value Ri used for link integrity verification. The Ki, Mi, and Ri values are generated in response to a control signal (identified as "ctl3" in FIG. 1), which is received at the appropriate circuitry in the transmitter, and is also sent by the transmitter to the receiver, during each vertical blanking period, when DE is low. As shown in the timing diagram of FIG. 1, the control signal "ctl3" is a single high-going pulse. In response to the Ki, Mi, and Ri values, each of the transmitter and receiver generates a sequence of pseudo-randomly generated 24-bit words cout [23:0]. Each 24-bit word of the cout data generated by the transmitter is "Exclusive Ored" (in logic circuitry in the transmitter) with a 24-bit word of a frame of video data (to encrypt the video data). Each 24-bit word of the cout data generated by the receiver is "Exclusive Ored" (in logic circuitry in the receiver) with a 24-bit word of the first received frame of encrypted video data (to decrypt this encrypted video data). The 24-bit words cout[23:0] generated by the transmitter are content encryption keys (for encrypting a line of input video data), and the 24-bit words cout[23:0] generated by the receiver are content decryption keys (for decrypting a received and decoded line of encrypted video data).

During each horizontal blanking interval (in response to each falling edge of the data enable signal DE) following assertion of the control signal ctl3, the transmitter performs a rekeying operation and the receiver performs the same rekeying operation to change (in a predetermined manner) the cout data words to be asserted during the next active video period. This continues until the next vertical blanking period, when the control signal ctl3 is again asserted to cause each of the transmitter and the receiver to calculate a new set of Ki and Mi values (with the index "i" being incremented in response to each assertion of the control signal ctl3). The Ri value is updated once every 128 frames. Actual encryption of input video data or decryption of received, decoded video data (or encryption of input video, audio, or other data, or decryption of received, decoded video, audio, or other data, in the case of an HDMI-compliant system) is performed, using the cout data words generated in response to the latest set of Ks, Ki and Mi values, only when DE is high (not during vertical or horizontal blanking intervals).

Each of the transmitter and receiver includes an HDCP cipher circuit (sometimes referred to herein as an "HDCP cipher") of the type shown in FIG. 2. The HDCP cipher includes linear feedback shift register (LFSR) module 80, block module 81 coupled to the output of LFSR module 80, and output module 82 coupled to an output of block module 81. LFSR module 80 is employed to re-key block module 81 in response to each assertion of an enable signal (the signal "ReKey" shown in FIG. 2), using the session key (Ks) and the current frame key (Ki). Block module 81 generates (and provides to module 80) the key Ks at the start of a session and generates (and applies to module 80) a new value of key Ki at the start of each frame of video data (in response to a rising edge of the control signal "ctl3," which occurs in the first vertical blanking interval of a frame). The signal "ReKey" is asserted to the FIG. 2 circuit at each falling edge of the DE signal (i.e., at the start of each vertical and each horizontal blanking interval), and at the end of a brief initialization period (during which module 81 generates an updated value of the frame key Ki) after each rising edge of signal "ctl3."

Module 80 consists of four linear feedback shift registers (having different lengths) and combining circuitry coupled to the shift registers and configured to assert a single output bit per clock interval to block module 81 during each of a fixed number of clock cycles (e.g., 56 cycles) commencing on each assertion of the signal "ReKey" when DE is low (i.e., in the horizontal blanking interval of each line of video data). This output bit stream is employed by block module 81 to re-key itself just prior to the start of transmission or reception of each line of video data.

Block module 81 comprises two halves, "Round Function K" and "Round Function B," as shown in FIG. 3. Round Function K includes 28-bit registers Kx, Ky, and Kz, seven S-Boxes (each a 4 input bit by 4 output bit S-Box including a look-up table) collectively labeled "S-Box K" in FIG. 3, and linear transformation unit K, connected as shown. Round Function B includes 28-bit registers Bx, By, and Bz, seven S-Boxes (each a 4 input bit by 4 output bit S-Box including a look-up table) collectively labeled "S-Box B" in FIG. 3, and linear transformation unit B, connected as shown. Round Function K and Round Function B are similar in design, but Round Function K performs one round of a block cipher per clock cycle to assert a different pair of 28-bit round keys (Ky and Kz) each clock cycle in response to the output of LFSR module 80, and Round Function B performs one round of a block cipher per clock cycle, in response to each 28-bit round key Ky from Round Function K and the output of LFSR module 80, to assert a different pair of 28-bit round keys (By and Bz) each clock cycle. The transmitter generates value An at the start of the authentication protocol and the receiver responds to it during the authentication procedure. The value An is used to randomize the session key. Block module 81 operates in response to the authentication value (An), and the initialization value (Mi) which is updated by output module 82 at the start of each frame (at each rising edge of the control signal "ctl3").

Each of linear transformation units K and B outputs 56 bits per clock cycle. These output bits are the combined outputs of eight diffusion networks in each transformation unit. Each diffusion network of linear transformation unit K produces seven output bits in response to seven of the current output bits of registers Ky and Kz. Each of four of the diffusion networks of linear transformation unit B produces seven output bits in response to seven of the current output bits of registers By, Bz, and Ky, and each of the four other diffusion networks of linear transformation unit B produces seven output bits in response to seven of the current output bits of registers By and Bz.

In Round Function K, one bit of register Ky takes its input from the bit stream asserted by module 80 when the ReKey signal is asserted. In Round Function B, one bit of register By takes its input from the bit stream asserted by module 80 when the ReKey signal is asserted.

Output module 82 performs a compression operation on the 28-bit keys (By, Bz, Ky and Kz) asserted to it (a total of 112 bits) by module 81 during each clock cycle, to generate one 24-bit block of pseudo-random bits cout[23:0] per clock cycle. Each of the 24 output bits of module 82 consists of the exclusive OR ("XOR") of nine terms as follows: (B0*K0)+(B1*K1)+(B2*K2)+(B3*K3)+(B4*K4)+(B5*K5)+(B6*K6)+(B7)+(K7), where "*" denotes a logical AND operation and "+" denotes a logical XOR operation.

In the transmitter, logic circuitry 83 (shown in FIG. 2) receives each 24-bit word of cout data and each input 24-bit RGB video data word, and performs a bitwise XOR operation thereon in order to encrypt the video data, thereby generating a word of the "data_encrypted" data indicated in FIG. 2. Typically, the encrypted data subsequently undergoes TMDS encoding before it is transmitted to a receiver. In the receiver, logic circuitry 83 (shown in FIG. 2) receives each 24-bit block of cout data and each recovered 24-bit RGB video data word (after the recovered data has undergone TMDS decoding), and performs a bitwise XOR operation thereon in order to decrypt the recovered video data.

Throughout the specification the expression "TMDS-like link" will be used to denote a serial link capable of transmitting encoded data (e.g., encoded digital video data), and optionally also a clock for the encoded data, from a transmitter to a receiver, and optionally also capable of transmitting (bidirectionally or unidirectionally) one or more additional signals (e.g., encoded digital audio data or other encoded data) between the transmitter and receiver, that is or includes either a TMDS link or a link having some but not all of the characteristics of a TMDS link. Examples of TMDS-like links include links that differ from TMDS links only by encoding data as N-bit code words (where N 10, and thus are not 10-bit TMDS code words) and links that differ from TMDS links only by transmitting encoded video over more than three or less than three conductor pairs. Some TMDS-like links encode input video data (and other data) to be transmitted into encoded words comprising more bits than the incoming data using a coding algorithm other than the specific algorithm used in a TMDS link, and transmit the encoded video data as in-band characters and the other encoded data as out-of-band characters (HDMI-compliant systems encode audio data for transmission according to an encoding scheme that differs from the encoding scheme employed for video data). The characters need not be classified as in-band or out-of-band characters based according to whether they satisfy transition minimization and DC balance criteria. Rather, other classification criteria could be used. An example of an encoding algorithm, other than that used in a TMDS link but which could be used in a TMDS-like link, is IBM 8b10b coding. The classification (between in-band and out-of-band characters) need not be based on just a high or low number of transitions. For example, the number of transitions of each of the in-band and out-of-band characters could (in some embodiments) be in a single range (e.g., a middle range defined by a minimum and a maximum number of transitions).

The term "transmitter" is used herein in a broad sense to denote any unit capable of transmitting data over a link and optionally also encoding and/or encrypting the data to be transmitted. The term "receiver" is used herein in a broad sense to denote any unit capable of receiving data that has been transmitted over a link (and optionally also decoding and/or decrypting the received data). Unless otherwise specified, a link can but need not be a TMDS-like link or other serial link. The term transmitter can denote a transceiver that performs the functions of a receiver as well as the functions of a transmitter.

The expression "content key" herein denotes data that can be used by a cryptographic device to encrypt content (e.g., video, audio, or other content), or to denote data that can be used by a cryptographic device to decrypt encrypted content.

The term "key" is used herein to denote a content key, or data that can be used by a cryptographic device to generate or otherwise obtain (in accordance with a content protection protocol) a content key. The expressions "key" and "key data" are used interchangeably herein.

The term "stream" of data as used herein denotes that all the data are of the same type and are transmitted from a source to a destination device. All or some of the data of a "stream" of data together may constitute a single logical entity (e.g., a movie or song, or portion thereof).

The term "channel," as used herein, refers to that portion of a link that is employed to transmit data (e.g., a particular conductor or conductor pair between the transmitter and receiver over which the data are transmitted, and specific circuitry within the transmitter and/or receiver used for transmitting and/or recovery of the data) and to the technique employed to transmit the data over the link.

The term "HDCP protocol" is used herein in a broad sense to denote both the conventional HDCP protocol and modified HDCP protocols that closely resemble the conventional HDCP protocol but differ therefrom in one or more respects. Some but not all embodiments of the invention implement an HDCP protocol. The conventional HDCP protocol encrypts (or decrypts) data during active video periods but not during blanking intervals between active video periods. An example of a modified HDCP protocol is a content protection protocol that differs from the conventional HDCP protocol only to the extent needed to accomplish decryption of data transmitted between active video periods (as well as decryption of video data transmitted during active video periods) or to accomplish encryption of data to be transmitted between active video periods (as well as encryption of video data to be transmitted during active video periods).

A example of an HDCP protocol that is a modified version of the conventional HDCP protocol is an "upstream" variation on the conventional HDCP protocol (to be referred to as an "upstream" protocol). A version of the upstream protocol is described in the *Upstream Link for High-bandwidth Digital Content Protection*, Revision 1.00, by Intel Corporation, Jan. 26, 2001 (referred to hereinafter as the "Upstream Specification"). In the upstream protocol, the "transmitter" is a processor programmed with software for implementing the upstream protocol to communicate with a graphics controller (with the graphics controller functioning as a "receiver"). Such a processor can send video data to the graphics controller after executing an authentication exchange in accordance with the "upstream" protocol. The processor and graphics controller can be elements of a personal computer configured to send encrypted video data from the graphics controller to a display device. The graphics controller and display device can be configured to execute another encryption protocol (e.g., the above-mentioned conventional HDCP protocol, which can be referred to in this context as the "downstream" HDCP protocol) to allow the graphics controller (this time functioning as a "transmitter") to encrypt video data and send the encrypted video to the display device, and to allow the display device (functioning as a "receiver") to decrypt the encrypted video.

However, in contrast to the present invention, the upstream protocol would not provide adequate protection to raw content that is present in a processor of a personal computer (or other open system), where the processor is programmed with software for implementing the upstream protocol (with the processor functioning as a "transmitter") to communicate with (and send the raw content to) a graphics controller functioning as a "receiver," to allow the graphics controller (this time functioning as a "transmitter") to encrypt the raw content and transmit the resulting encrypted content (in accordance with the "downstream" HDCP protocol) to a device (e.g., a display device) external to the open system.

There are a number of structural flaws in the upstream protocol, and a personal computer (or other open system) that implements the upstream protocol would be subject to at least one attack in which the attacker could access the raw content present within the open system. An example of such an attack is a "man-in-the-middle" attack, in which the upstream authentication requests (from the graphics controller) are intercepted and the corresponding responses (to the graphics controller) are forged. A personal computer that implements the upstream protocol is easily attacked for one fundamental reason: at least two of the system elements (the application and the video driver) are in software. They can be debugged, de-compiled, altered, and copied, with any resulting "hack" potentially distributed quickly and easily across the Internet.

Thus, the upstream protocol is fundamentally flawed and will allow people of ordinary skills (and with no special hardware or tools) to bypass the intended HDCP protections. Furthermore, this can happen on a large scale, and can not readily be detected or counteracted.

The following is a list of the flaws of the upstream protocol (as implemented in a personal computer) that permit attacks of the type mentioned above:
  key length is too short. Upstream authentication uses a key length of 56 bits, which is too short to be considered secure;
  drivers can be hacked. If a driver is compromised, then the software application must assume that all of its communication is compromised;
  there is no connection between downstream and upstream authentication. The software application can not validate that a proper "downstream" authentication has occurred;
  there is no upstream revocation. No revocation mechanism is defined for the upstream link; and
  the software and driver are not secure. The application software and driver can be studied, altered, copied, distributed, and otherwise assaulted.

SUMMARY OF THE INVENTION

In a class of embodiments, the invention is a computing system (e.g., a PC) having an open system architecture. The system includes a closed subsystem which generates protected content, and a computing subsystem. The closed subsystem (sometimes referred to as being "embedded" in the open system) typically consists of multiple parts which are potentially provided by separate and independent suppliers. Typically, the closed subsystem is configured to generate the protected content by encrypting raw content, and to prevent the raw content (and key data used for encrypting the raw content) from being revealed to any element of the computing system outside the closed subsystem. In some embodiments, the closed subsystem is configured to assert the protected content directly to an external system (a system external to the open system), e.g., to an external, closed, audiovisual system configured to decrypt the protected content. In some such embodiments, the external system includes a cryptographic device, and the closed subsystem is configured to disclose key data to the cryptographic device (e.g., as part of a verification operation) as necessary to enable the cryptographic device to decrypt the protected content. In other embodiments, the protected content is asserted from the closed subsystem through at least one other element of the inventive open system to an external system (e.g., the protected content is "tunneled" through the open system to the external system).

In preferred embodiments, the protected content is or includes video data (e.g., high-definition digital video data). Typically, content (that has been encrypted using a first content protection protocol) enters the closed subsystem (e.g., by being read from a disk) and the closed subsystem decrypts and re-encrypts the content using a different content protection protocol. In typical embodiments, content that enters (or is generated within) the closed subsystem is afforded a level of protection within the inventive open system that is similar to that which can be obtained in standalone closed systems (e.g., HD DVD players that are closed systems).

In preferred embodiments, the closed subsystem of the inventive open system includes a closed unit (to be referred to as a "DDR" unit) that receives encrypted content, performs decryption and any required decompression on the received content to generate raw content, and re-encrypts the raw content. Preferably, the received content is or includes encrypted video (e.g., high definition video that has been read from an HD-DVD and is protected by CSS or a content protection scheme similar to CSS), and the DDR unit is configured to perform decryption of the encrypted video to generate decrypted, compressed video (e.g., MPEG or MPEG-2 compressed video), to perform decompression on the compressed video to generate decrypted, decompressed video ("raw" video), and to re-encrypt the raw video. Preferably, the re-encryption is performed in accordance with the HDCP protocol. In preferred embodiments, the re-encrypted raw data are sent over one or more HDMI links from the DDR unit (typically via "combiner" circuitry of the closed subsystem) to an external audiovisual system. Alternatively, the DDR unit asserts the re-encrypted raw data to the open system for forwarding to an external audiovisual system. In alternative embodiments, the DDR unit re-encrypts raw (decrypted) data in accordance with a content protection protocol other than HDCP, and asserts re-encrypted data to an external device (or to combiner circuitry of the closed subsystem for forwarding to an external device, or to the open system for forwarding to an external device) over a link other than an HDMI link. In some embodiments, the DDR unit asserts re-encrypted data to an external device (or to combiner circuitry of a closed subsystem of an open system) over one or more DVI links. In other embodiments, the DDR unit asserts the re-encrypted data over one or more TMDS-like links (none of which is an HDMI or DVI link), or over one or more serial links (none of which is a TMDS-like link).

Other aspects of the invention are methods for protecting content in an open system, methods that can be implemented by any embodiment of the inventive system, a closed system configured to be embedded in an open system (for use in accordance with the invention as a closed subsystem of the open system), methods for modifying a conventional open system to include an embedded closed subsystem, and circuitry (e.g., combiner circuitry) configured to be embedded in an open system for combining the output of a closed subsystem of the open system with other output (e.g., graphics and/or audio output) of the open system.

DETAILED DESCRIPTION OF THE PREFERRED EMBODIMENTS

Figure 1:
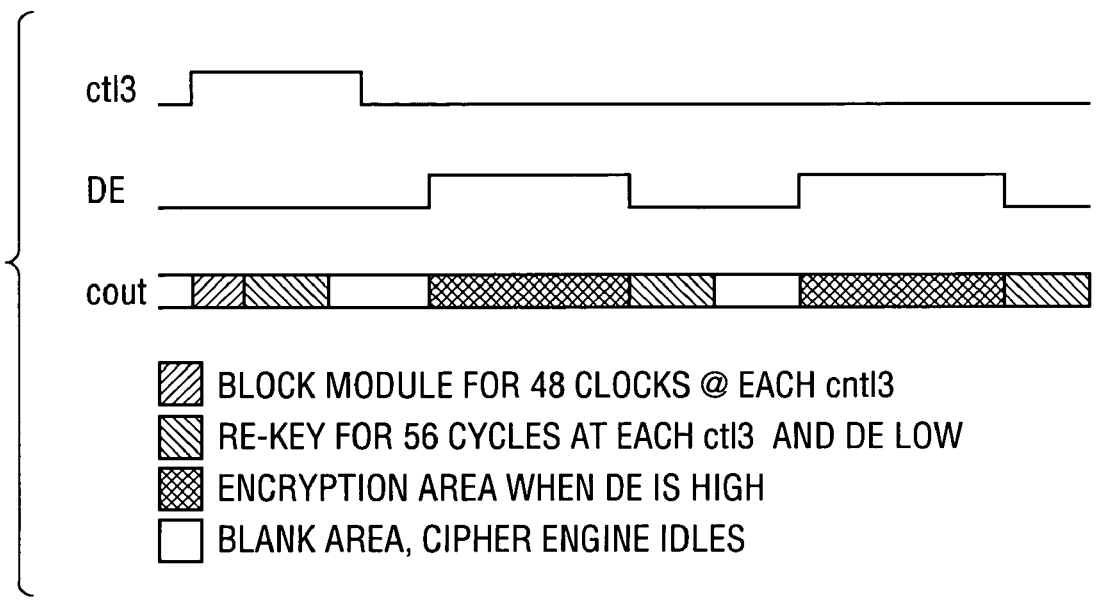
FIG. 1 is a timing diagram of signals generated conventionally to encrypt digital video data to be transmitted over a DVI link using the conventional High-bandwidth Digital Content Protection ("HDCP") protocol.
Figure 2:
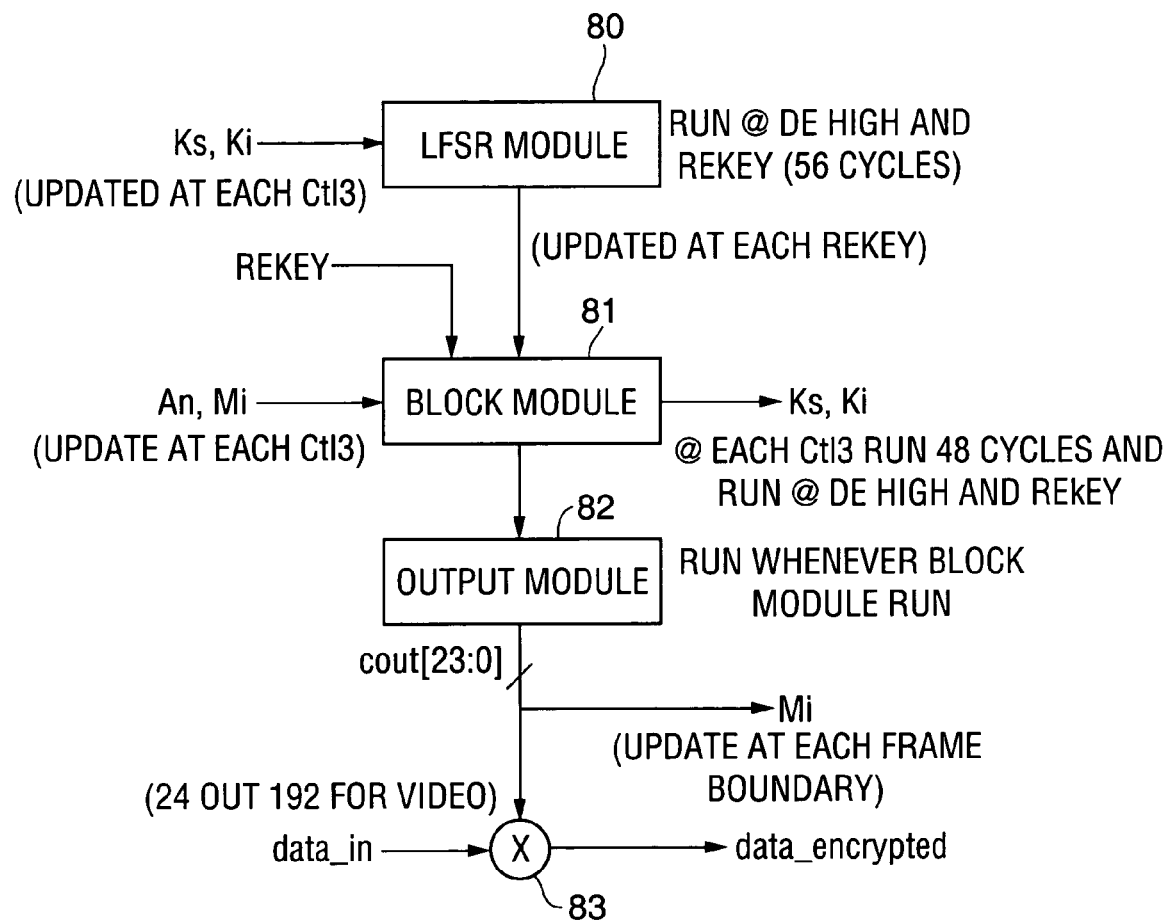
FIG. 2 is a block diagram of conventional circuitry for encrypting digital video data to be transmitted over a DVI link.
Figure 3:
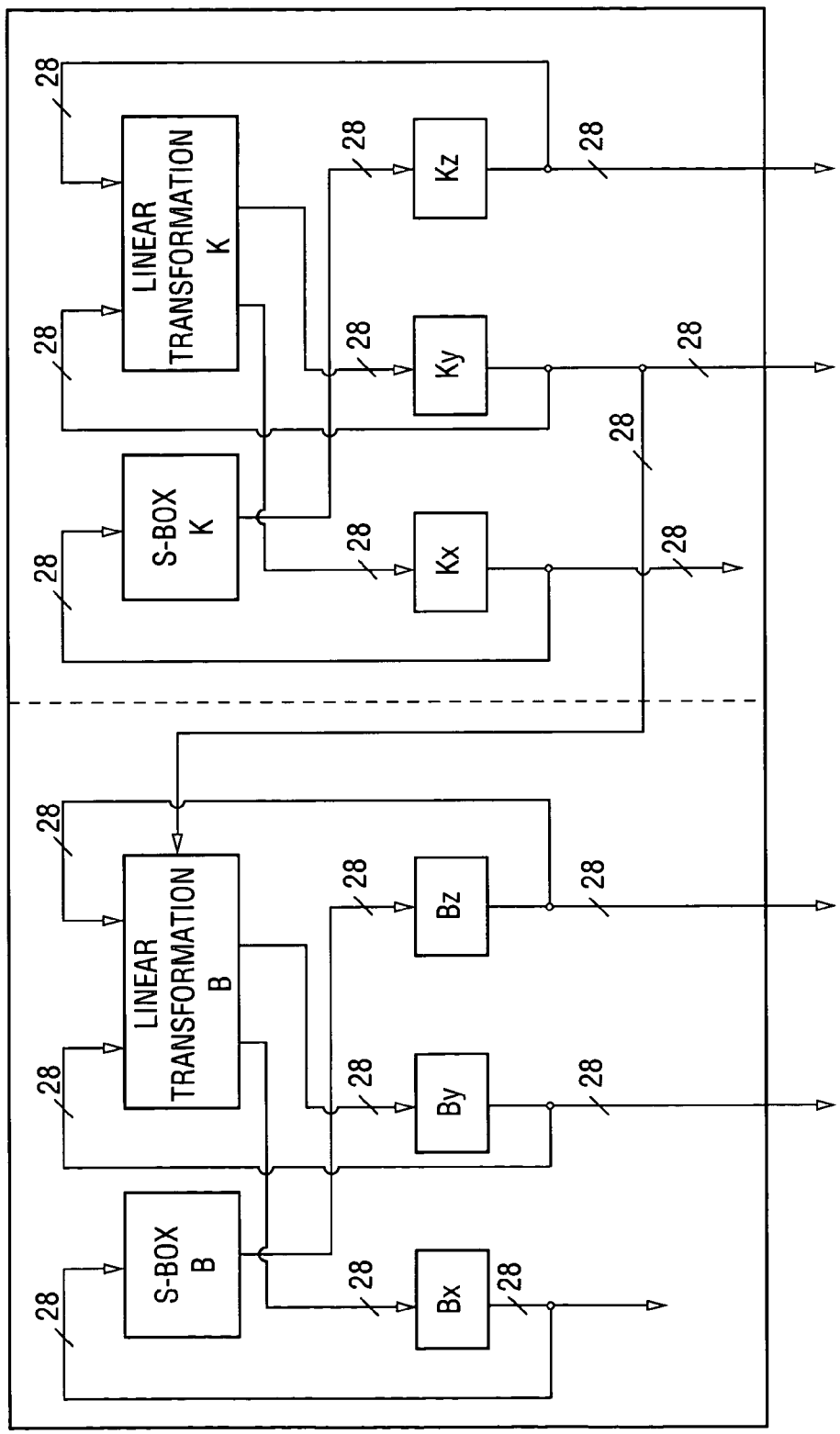
FIG. 3 is a simplified block diagram of module 81 of FIG. 3.

Modern Personal Computers (PCs) have evolved from strictly computing devices into communication and entertainment devices. As a result, users desire to view prerecorded video entertainment, including feature length movies, on their PC. In addition, the increased performance of processors makes it look advantageous to use the PC's processor to, for example, decode and play DVD movies.

However, the producers of content (e.g., entertainment content, such as movies) protected by (or as) intellectual property rightly are concerned about unauthorized use and copying of their property. If high quality copies of movies or other works can be made and distributed widely, e.g. via the internet, then the intellectual property quickly loses its value to the owner. In order to protect such content, the Content Scrambling System (CSS) was created to encrypt video content for DVDs. CSS is a cryptographic scrambling mechanism used on top of an MPEG compressed version of the original, raw video data. Each device that can play DVD content must have one or more cryptographic keys that allow the content to be descrambled (i.e. decrypted).

Within standalone consumer electronic gear, such as a standalone DVD player, this provides a considerable protection, because both the keys and decrypted content stay within a closed system created by a licensee of CSS. The expression "closed system" (or "closed subsystem") is used herein to denote a system (or subsystem) in which the end user has no means to add or remove either hardware components or software modules. Therefore, there is no simple method for "cracking" the content protection method.

By contrast, current standard definition DVD content can be decoded in software on PCs which are open systems rather than closed systems. Unfortunately, the very nature of software decode in an open system such as a PC means that the content cannot be effectively protected. At some point during the decode process, both the CSS keys and the decrypted video content are available within the registers and/or memory of the PC. Since, in a PC, a user can either intentionally or unintentionally load malicious programs or drivers, and such modules can gain access to the keys and/or content, the CSS protection is easily circumvented. In fact, two widely published attacks have been made. First, the CSS key for the Xing software decoder was found by reverse engineering the software module, and this key was traded among hackers. In addition, a CSS decryption program called DeCSS was created and distributed.

So far, the economic damage of these breaches of the content protection system has been limited because the image quality of standard definition video is much lower than theatrical quality. That is, much of the intrinsic value of the original movie is lost in the conversion from the higher definition original to standard TV definition. In addition, until recently it has been impractical to transfer large files, like decrypted movies, between users.

Today, High Definition TV (HDTV) is becoming more popular, and is expected to supplant standard definition TV in a few years. In order to provide consumers with prerecorded material of sufficient quality, HDTV DVDs (HD-DVDs) are being designed. As in the case of standard DVDs, standalone players for HD-DVDs with something similar to CSS should provide strong content protection. However, decoding HD-DVD content within an open system such as a PC creates a vulnerability. This is because, if unauthorized copies of HD-DVD content can be made, it will be essentially of the same quality of the original theatrical release. In addition, modern network technology will easily enable a Napster-like trading of such movies. As a result, the owner of the intellectual property will quickly find that the property has become worthless.

In essence, if software within an open system either manipulates unencrypted keys or content, the keys or content are easily revealed for unauthorized uses. That is, if the computer can decrypt the content, both the keys and the decryption program must be visible to the processor and, therefore, visible to other, potentially malicious, software that is loaded within the system. This vulnerability is often referred to as the "software hole" in content protection systems.

When software decryption of standard DVDs was initially deployed, the "software hole" was not completely understood. Keys within the software were obscured and thought to be secure. This "security through obscurity" was quickly shown to be illusory when the Xing key was extracted. Since then, much of the effort of the computer industry has gone into secure methods of storing the decryption key (e.g., the Microsoft Palladium Initiative, later renamed as the Next Generation Secure Computing Base). However, although this would make stealing the keys more challenging, it does not substantially improve security of the keys and does nothing to protect the content. Note that if the authorized player can obtain the key without manual intervention (e.g. the user entering a password needed to decrypt the content protection key), then any other program using the same procedure or algorithm can also obtain the key. If such a program was written in a malicious manner, the key could, for example, be sent over the internet to millions of others in a few seconds. Similarly, since a software decoder requires that the key and decryption process or algorithm be visible to the processor, it can be observed and emulated by the attacker, resulting in unauthorized decryption of the content.

Within standalone HD-DVD players (or other closed systems), by contrast, existing mechanisms can be employed to protect the keys and HD-DVD content. As a "closed" system, a standalone DVD player does not provide a way for a user to add or remove hardware or software. Therefore, it is relatively simple to ensure that the keys are stored and used in a way that does not reveal them outside the closed system. By re-encrypting the decrypted content (e.g., using HDCP) and asserting the re-encrypted content at the player's output (e.g., asserting the re-encrypted content over an HDMI link from the player to an external device), the content is well-protected even after decryption in the player. Only another closed system (e.g., an HDCP licensee device, such as a high definition monitor) can decrypt and display the re-encrypted content. In order to break this copy protection, a cracker would have to break into one or more of the boxes (the player and/or the high definition monitor), and essentially modify circuitry within each opened box. Such an operation is well beyond the capabilities of the usual cracker. If the standalone DVD player will output only re-encrypted content, and will output the re-encrypted content only to another device that participates in the HDCP copy protection, unencrypted data is not available at any external connection of the entire system, and may only be viewed as the output of the video display.

In a class of embodiments, the invention is a computing system (e.g., a PC) having an open system architecture, in which a protected, closed subsystem is embedded. In other embodiments, the invention is a method for modifying a conventional open system to include such an embedded closed subsystem. The closed subsystem consists of multiple parts, potentially provided by separate and independent suppliers, that ensure that content protection keys and the protected content are never revealed outside the closed subsystem. Content (e.g., high-definition digital video) that enters the closed subsystem (and is typically decrypted and re-encrypted within the closed subsystem) is afforded a similar level of protection within the inventive open system as can be obtained in standalone closed systems (e.g., HD DVD players that are closed systems).

In preferred embodiments, the open system of the invention includes a closed unit that receives (or generates) encrypted content, performs decryption (e.g., descrambling) and any required decompression on the received content to generate raw content, and re-encrypts the raw content. This unit will be henceforth called a "DDR" unit. In preferred embodiments, the open system of the invention includes a DDR unit configured to perform decryption of encrypted video (e.g., high definition video that has been read from an HD-DVD) that is protected by CSS (or a content protection scheme similar to CSS) to generate decrypted, compressed video (e.g., MPEG or MPEG-2 compressed video), to perform decompression on the compressed video to generate decrypted, decompressed video ("raw" video), and to re-encrypt the raw video. Preferably, the re-encryption is performed in accordance with the HDCP protocol. In preferred embodiments, the re-encrypted raw data are sent over one or more HDMI links from the DDR unit (typically via "combiner" circuitry of the closed subsystem) to an external audiovisual system. The audiovisual system is external to the inventive open system, and can include an HDTV monitor (including an HDMI receiver) and one or more loudspeakers. Alternatively, the DDR unit re-encrypts the raw data in accordance with a content protection protocol other than HDCP, and asserts the re-encrypted data over a link other than an HDMI link.

The expression "audiovisual system" is used herein to denote a system or device capable of displaying video data and/or emitting sound in response to audio data. Typical embodiments of the invention include an open computing system and an audiovisual system external (and coupled) to the open computing system. Typically, the audiovisual system is coupled to the open computing system by a serial link. An example of an audiovisual system is an HDTV monitor (including an HDMI receiver capable of decrypting encrypted video and audio data received over an HDMI link) and one or more loudspeakers.

The expression "audiovisual data" is used herein to denote video data, or audio data, or data comprising both video data and audio data.

In some embodiments, the inventive open system includes an HD-DVD drive, and a DDR unit is provided within the HD-DVD drive. Such an HD-DVD drive, by itself, is another aspect of the invention. Use of such an HD-DVD drive in an open system ensures that the system can read HD-DVDs that contain protected content and still provide strong protection for the content.

Typically, the HD-DVD drive would include an HDMI interface (e.g., the HDMI interface of FIG. 6, comprising HDMI transmitter 33 and connector 33A for coupling transmitter 33 to an HDMI cable) in addition to a data interface (e.g., SATA interface 34 of FIG. 6 with connector 34A, or an ATA or SCSI interface with appropriate connector) used for reading and writing non-protected data. The HDMI interface would provide a connection separate from that provided by the data interface, analogous to the separate analog audio connection that a CD-ROM uses for providing CD audio to the sound card of a PC.

The expression "non-protected" data herein denotes data, which may or may not be subject to intellectual property protection, but which the HD-DVD drive is configured to recognize as assertable in nonencrypted form to an open computing system.

The expression "SATA interface" herein denotes an interface configured for communication over at least one serial link in compliance with the SATA standard. The expression "SATA standard" herein denotes the standard known as Serial ATA, Revision 1.0, adopted on Aug. 29, 2001, by the Serial ATA Working Group, for communication between a host and one or more storage devices over one or more serial links.

However, a separate HDMI connection is not necessary, and in some embodiments (for example, the embodiment to be described with reference to FIG. 12) the HDCP-encrypted data would be "tunneled" through the same data interface that is used for reading and writing non-protected data. In the latter embodiments, the HDMI interface would encrypt (e.g., re-encrypt) the protected content, thereby generating HDCP-encrypted data, and the HDCP-encrypted data would propagate through the open computing system to an HDMI receiver within a closed system (e.g., an HDMI receiver within an HDTV monitor or other display device). Even though the open computing system has access to the HDCP-encrypted content, it cannot decrypt such encrypted content and instead merely passes it through to the HDMI receiver in the closed system.

An aspect of the invention is circuitry for combining the output of the DDR unit with standard (unprotected) graphics and audio output of an open system. Typically, modern PCs have one of two types of graphics systems. Low end PCs have a graphics controller integrated into their chipset (e.g., into GMCH chip 6 of FIG. 4) and use an AGP Digital Display card (e.g., an ADD card similar or identical to card 10 of FIG. 4) to route the digital video connection to a bulkhead HDMI/DVI connector. Higher end PCs typically use a more sophisticated graphics controller directly on an AGP or PCI-Express graphics card (e.g., a media/graphics card similar to card 20 of FIG. 5). Older PCs use a graphics controller on either AGP, PCI, or ISA bus. In any case, there is typically a single board in the system which provides the video output for the system. We will call this board the "graphics card", regardless of the type of card it is.

Figure 4:
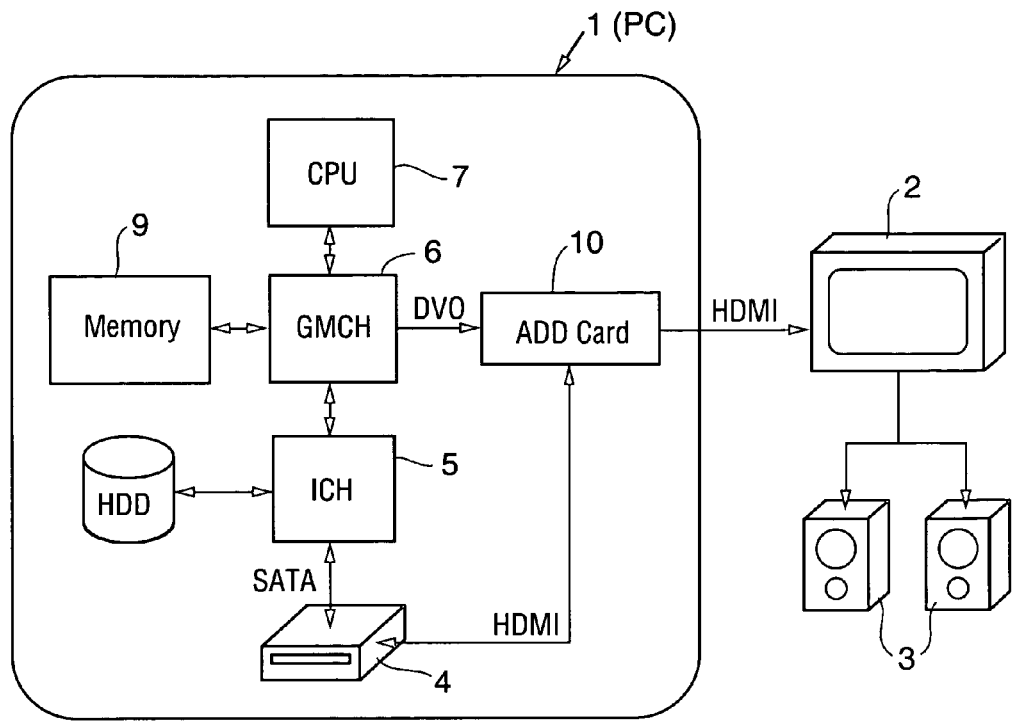
FIG. 4 is a block diagram of a system that embodies the invention.

In the system of FIG. 4, personal computer (PC) 1 is an open system that embodies the invention. PC 1 is coupled to an external audiovisual system that includes HDTV monitor 2 (which includes an HDMI receiver) and loudspeakers 3 driven by HDTV monitor 2. PC 1 includes HD-DVD drive 4. In the FIG. 6 implementation of disk drive 4, drive controller 30 asserts data read from an HD-DVD disk (not shown) to multiplexer 31. Preferably, multiplexer 31 includes circuitry for detecting whether the data from controller 30 are non-protected data (e.g., non-protected menu information or the like). When multiplexer 31 detects that the data from controller 30 are non-protected data, multiplexer 31 asserts the data to SATA interface 34. Otherwise (e.g., when multiplexer 31 detects that the data from controller 30 are copyrighted content, e.g., copyrighted high definition video), multiplexer 31 asserts the data from controller 30 to DVD decoder 32.

PC 1 also includes I/O controller hub (ICH) chip 5 which is coupled to receive data from SATA interface 34. ICH chip 5 controls I/O functions (e.g., USB functions) of PC 1. ICH chip 5 is coupled via graphics and memory controller hub (GMCH) chip 6 to CPU 7. GMCH chip 6 handles such functions as PCI (peripheral communications interconnect) bus functions, Level 2 cache activities, and AGP (accelerated graphics port) activities. Memory 9 and AGP Digital Display (ADD) card 10 are coupled to GMCH chip 6.

Data from the SATA interface 34 of disk drive 4 can flow via ICH chip 5 and GMCH chip 6 into memory 9, be processed by CPU 7, and potentially, result in graphics data or non-copy-protected video data being output to ADD card 10 and to monitor 2. Elements 5, 6, 7, and 9 thus comprise a computing subsystem of PC 1 that has an open system architecture and is configured to generate data for assertion to monitor 2 via ADD card 10.

Figure 7:
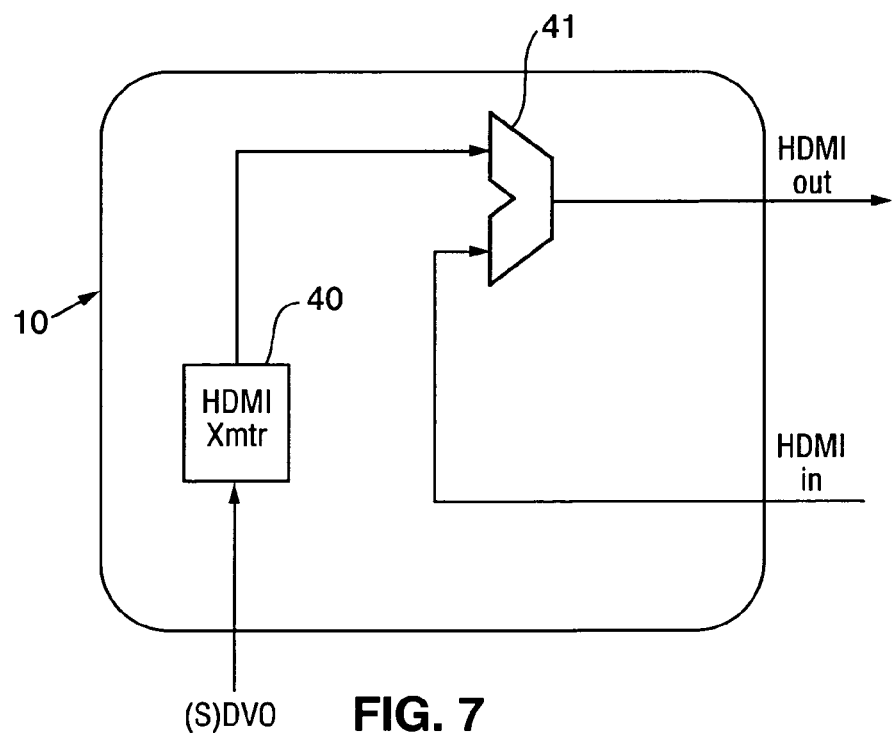
FIG. 7 is a block diagram of an embodiment of card 10 of FIG. 4.

Card 10 includes an HDCP transmitter (e.g., transmitter 40 of FIG. 7) which performs HDCP encryption on digital video and audio data from chip 6. Card 10 is configured to assert the resulting HDCP-encrypted digital video and audio over an HDMI link to monitor 2. The data asserted from GMCH chip 6 to ADD card 10 can be in DVO (digital video output) format.

Figure 6:
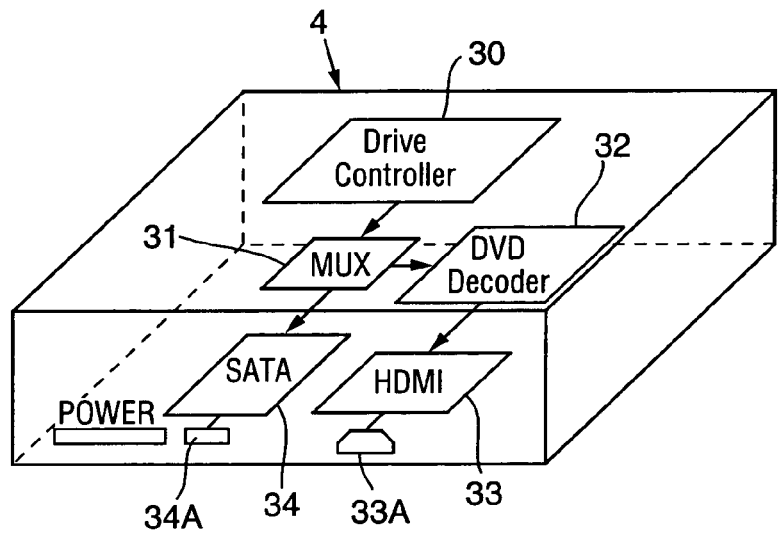
FIG. 6 is a block diagram of elements of an embodiment of disk drive 4 of FIG. 4 or FIG. 5.

When disk drive 4 is implemented as shown in FIG. 6, DVD decoder 32 performs decryption and decompression of high definition video data (from an HD DVD disk), and HDMI transmitter 33 re-encrypts the resulting raw video data (according to the HDCP protocol) and transmits the re-encrypted video data over an HDMI link (including HDMI connector 33A) directly to ADD card 10. Card 10 typically functions as an HDMI repeater to retransmit the re-encrypted video data over another HDMI link to monitor 2. Disk drive 4 also sends directly to card 10 over the HDMI link (for forwarding to monitor 2) any key data needed by monitor 2 to decrypt the re-encrypted video data (e.g., key data employed during an HDCP authentication exchange). The elements of PC 1 other than the closed subsystem embedded within PC 1 (disk drive 4, each element of ADD card 10 that belongs to the closed subsystem, and the HDMI link between drive 4 and card 10) have no access to the re-encrypted video data or the key data.

Figure 5:
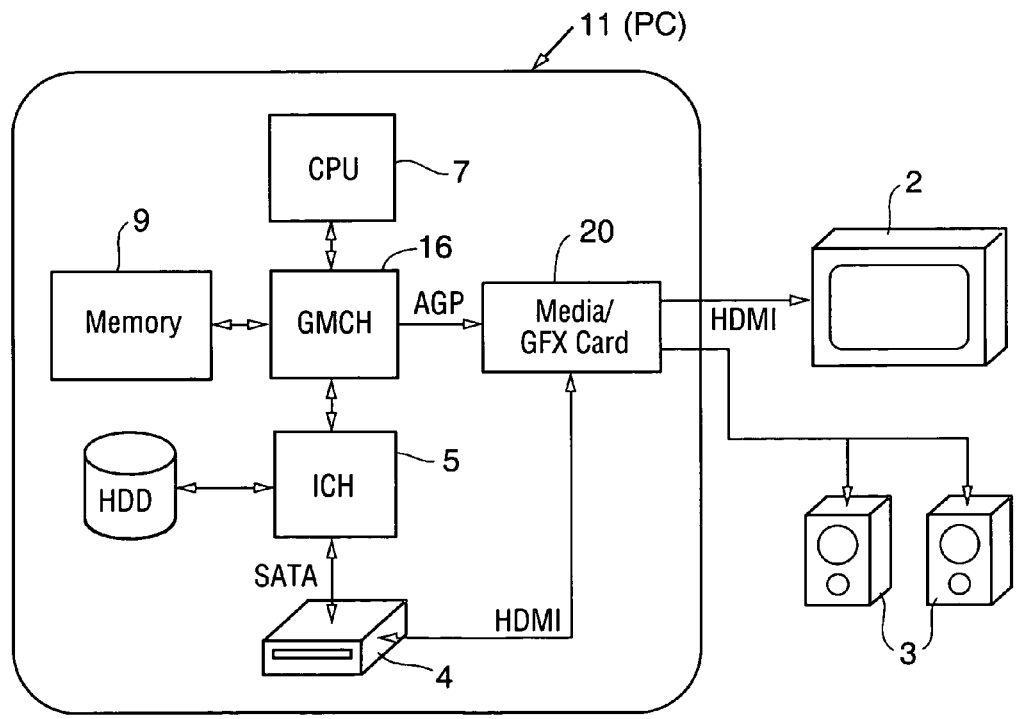
FIG. 5 is a block diagram of another system that embodies the invention.

FIG. 5 is a block diagram of a variation on the system of FIG. 4. The elements of FIG. 5 that are identical to those of FIG. 4 are identically numbered in both Figures. In FIG. 5, ADD card 10 is replaced by media/graphics card 20, and GMCH chip 6 (which includes integrated graphics circuitry) is replaced by GMCH chip 16. Chip 16 is configured to assert AGP format data to card 20. Card 20 is configured to assert HDCP-encrypted digital video over an HDMI link to monitor 2, and to assert analog audio data (generated in a DAC within card 20) directly to loudspeakers 3. Media/graphics card 20 also functions as an HDMI transceiver which retransmits HDCP-encrypted video data (received over a first HDMI link from drive 4) over a second HDMI link to monitor 2, and extracts HDCP-encrypted audio from the data received over the first HDMI link, decrypts the audio and performs digital-to-analog conversion thereon, and asserts the resulting analog audio directly to loudspeakers 3.

Figure 12:
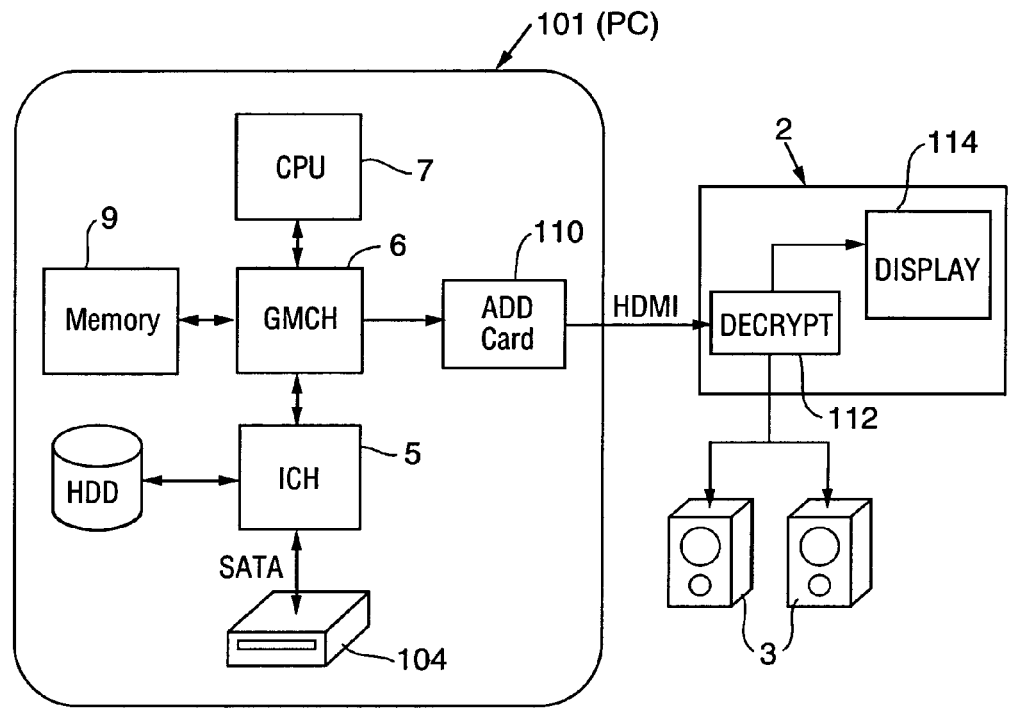
FIG. 12 is a block diagram of another system that embodies the invention.

FIG. 12 is a block diagram of another variation on the system of FIG. 4. The elements of FIG. 12 that are identical to those of FIG. 4 are identically numbered in both Figures. PC 101 of FIG. 12 differs from PC 1 of FIG. 4 in that ADD card 110 replaces ADD card 10 (of FIG. 4) and HD-DVD drive 104 replaces HD-DVD drive 4 (of FIG. 4).

Figure 13:
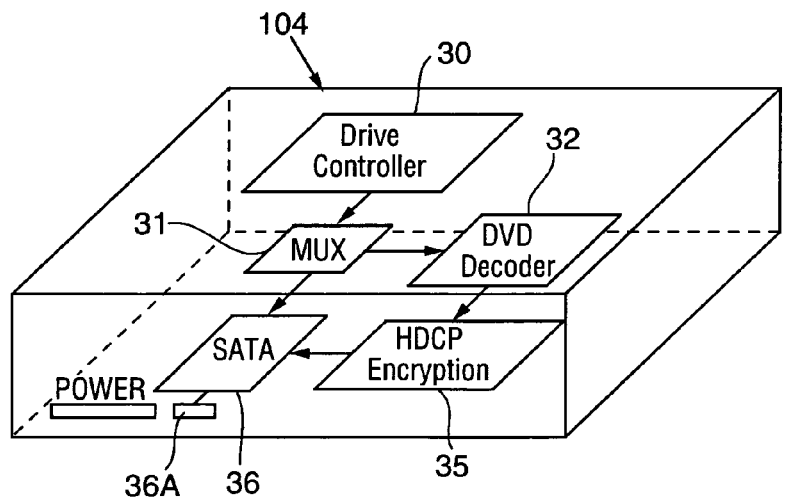
FIG. 13 is a block diagram of elements of an embodiment of disk drive 104 of FIG. 12.

Preferably, disk drive 104 is implemented as shown in FIG. 13. The elements of FIG. 13 that are identical to those of FIG. 6 are identically numbered in both Figures, and the FIG. 13 implementation of disk drive 104 differs from the FIG. 6 implementation of disk drive 4 in the following respects. In the FIG. 13 implementation of disk drive 104, HDMI connector 33A is omitted, SATA interface 34 is replaced by SATA interface 36 (having connector 36A), and HDMI transmitter 33 is replaced by HDCP encryption unit 35 (whose output is coupled to a second input of SATA interface 36). SATA interface 36 is configured to assert (to connector 36A) data, having SATA format, indicative of data received by interface 36 from drive controller 30 (via multiplexer 31) or indicative of HDCP-encrypted data received by interface 36 from encryption unit 35. When multiplexer 31 of disk drive 104 detects that the data from controller 30 are copyrighted high-definition video data (and/or copyrighted audio data), multiplexer 31 asserts the data to DVD decoder 32. In response, decoder 32 decodes (decrypts) and performs any necessary decompression on the data, and asserts the resulting raw (decoded, or decoded and decompressed) high-definition video (and/or audio) data to the input of HDCP encryption unit 35. In response, encryption unit 35 asserts an HDCP-encrypted version of the raw high-definition video (and/or audio) data to an input of SATA interface 36. The HDCP-encrypted data are "tunneled" through SATA interface 36 (within a data stream having SATA format) to ICH chip 5, and from ICH chip 5 via GMCH chip 6 and ADD card 110 to monitor 2. When multiplexer 31 (of disk drive 104) detects that the data from controller 30 are non-protected data, multiplexer 31 asserts the data to the other input of SATA interface 36. A data stream having SATA format, and indicative of the non-protected data, is asserted by interface 36 to ICH chip 5, and from ICH chip 5 via GMCH chip 6 and ADD card 110 to monitor 2.

ADD card 110 of FIG. 12 includes an HDCP transmitter which performs HDCP encryption on digital video and/or audio data from chip 6 and asserts the encrypted video and audio over an HDMI link to monitor 2. The encryption circuitry of the HDCP transmitter within card 110 is disabled or bypassed in the mode in which chip 6 forwards HDCP-encrypted data from disk drive 104 to card 110. Card 110 of FIG. 12 differs from ADD card 10 of FIG. 4 in that card 110 is not coupled directly to disk drive 104 (whereas card 10 is coupled directly to disk drive 4). Card 110 need not include a switch whose output is coupled to the HDMI link between card 110 and monitor 2. In contrast, card 10 of FIG. 4 includes a switch (e.g., switch 41 of FIG. 7) for selectively asserting to monitor 2 either data from its internal HDCP transmitter (e.g., transmitter 40 of FIG. 7) or HDMI-format, HDCP-encrypted data received directly from disk drive 4.

HDTV monitor 2 is typically implemented as a closed system. As shown in FIG. 12, monitor 2 typically includes an HDMI receiver 112, and a display device 114 (e.g., a CRT or LED display) coupled to receiver 112. Device 114 is configured to display decrypted video data produced in receiver 112. Receiver 112 includes HDCP decryption circuitry configured to decrypt encrypted audio and video data received from card 110, and is configured to assert the decrypted audio (typically after performing additional processing thereon, such as reformatting) to loudspeakers 3 and to assert the decrypted video (typically after performing additional processing thereon, such as reformatting) to display device 114.

In the FIG. 12 embodiment, HDCP encryption circuitry within disk drive 104 encrypts (re-encrypts) a decoded version of protected content received by disk drive 104 (e.g., read from a disk by disk drive 104), thereby generating HDCP-encrypted data. The HDCP-encrypted data propagate through PC 101 (an open computing system) to HDMI receiver 112 within an external device (HDTV monitor 2). Even though PC 101 has access to the HDCP-encrypted content, it cannot decrypt the HDCP-encrypted content since it lacks the keys to do so, and instead it merely passes the HDCP-encrypted content through to HDMI receiver 112 in monitor 2.

In alternative embodiments, the DDR unit of the inventive open system is separate and independent of a disk drive. For example, the DDR unit could be configured to receive, decrypt and decompress, and re-encrypt protected content from the internet or another source external to the inventive open system.

We next describe another aspect of the invention: circuitry for combining the output of a DDR unit with standard (unprotected) graphics and audio output of an open system. For example, in accordance with the present invention, the graphics card of a PC (e.g., card 10 of FIG. 4 or card 20 of FIG. 5) is augmented with another closed subsystem for dealing with protected content (including by combining the output of a DDR unit with standard graphics and/or audio output of the PC). This closed subsystem preferably includes an HDMI connector to receive re-encrypted data provided from the DDR unit (typically integrated in an HD-DVD drive) and a mechanism to combine (e.g., time-division-multiplex, or combine into picture-in-picture format) the re-encrypted data with the standard graphics and/or audio output of the open system. Preferably, the output of the augmented graphics card is, itself, an HDMI connection with HDCP copy protection capability, and the augmented graphics card is configured to forward HDCP encrypted data from the DDR unit to an external device only if the output of the graphics card is connected to an external device (e.g. HD monitor) that also supports HDCP. This prevents protected content from flowing through the augmented graphics card unless the external device (end device) supports the HDCP protection mechanism.

The simplest combination mechanism ("combiner circuitry") possible in the augmented graphics card of the invention is a switch (e.g., switch 41 of FIG. 7) which is configured to select either DVD video or system graphics output. The switch can be user-actuated so that the user can either choose to view protected content (e.g., the signal labeled "HDMI in" in FIG. 7, which is from disk drive 4) on the screen, or to view the output of the PC graphics (labeled "(S)DVO" in FIG. 7). In the FIG. 7 embodiment, ADD card 10 includes HDMI transmitter 40 and switch 41, connected as shown. Transmitter 40 receives the output of GMCH chip 6 of FIG. 4, performs HDCP encryption thereon, and asserts the HDCP-encrypted data over an HDMI link to switch 41. Switch 41 functions as an HDMI repeater which forwards to monitor 2 (over another HDMI link) either the output of transmitter 40 or the output of the DDR unit (e.g., the output of HDMI transmitter 33 of disk drive 4 of FIG. 6). An example of the inventive closed subsystem is a DDR unit within drive 4 (e.g., elements 31, 32, and 33 of drive 4 of FIG. 6) and switch 41 (within ADD card 10 of FIG. 7).

In some embodiments, the augmented graphics card would act as an "HDCP repeater" according to the HDCP specification. Such a repeater would simply pass HDCP authorization messages between the original source (the DDR unit) and the destination (e.g. the monitor) without being involved in the negotiation.

More elaborate combiner circuitry (e.g., within card 10) is also possible. For example, the combiner circuitry can be configured to embed the video display in part of the screen (e.g. where a graphics window is located), or even to rescale the protected content to another resolution and embed it in a display determined by non-protected content (to produce a combined display having appearance similar or identical to a picture-in-picture display in a conventional TV set).

The closed subsystem in the augmented graphics card of the invention is preferably configured to ensure that protected content (i.e., HDCP-encrypted content) is only presented on the output when the output is attached to an HDCP capable device. In some embodiments of this type, the augmented graphics card includes an HDCP authentication mechanism which would allow the augmented graphics card to decrypt the stream from a DDR unit, modify the decrypted data in allowed ways (e.g. rescale it), and then re-encrypt the modified data before sending it to the output. Such embodiments would typically require the addition of components to perform the decryption, one or more memory buffers for holding the data, optional scaling modules, retiming and positioning mechanisms, and a re-encryption mechanism. All of these components would be considered part of the closed subsystem of the augmented graphics card (and of the closed subsystem of the inventive open system), and they would be designed to prevent decrypted data from being observed or routed out of the closed subsystem without HDCP encryption being applied to the data.

Figure 8:
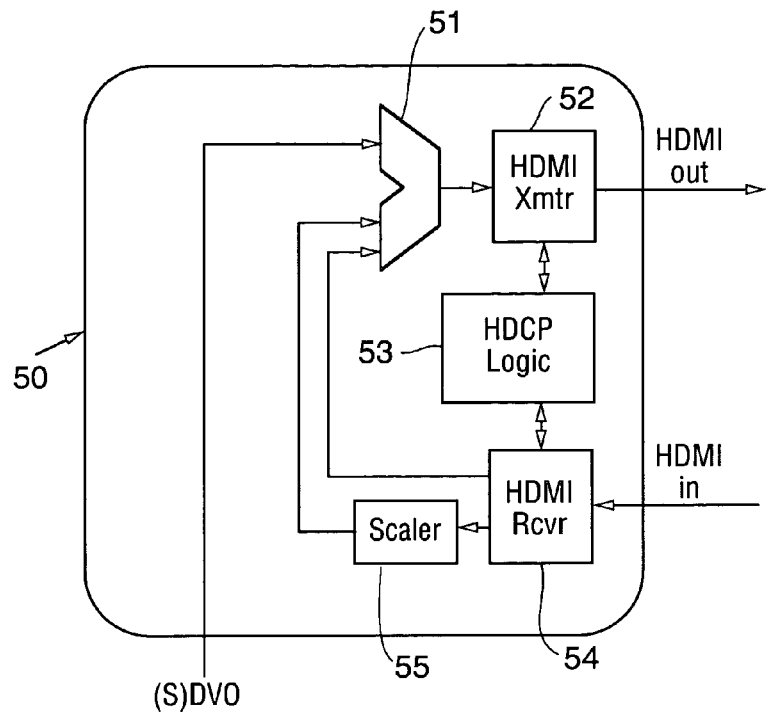
FIG. 8 is a block diagram of a substitute for card 10 of FIG. 4.

For example, ADD card 50 of FIG. 8 (which can replace card 10 of FIG. 7 in the FIG. 4 system) includes HDCP logic 53, HDMI receiver 54, scaler 55, switch 51, and HDMI transmitter 52, connected as shown. One input of switch 51 receives the output of GMCH chip 6 of FIG. 4. When switch 51 passes this data, HDMI transmitter 52 can perform HDCP encryption thereon, and assert the HDCP-encrypted data over an HDMI link to monitor 2. HDMI receiver 54 receives the output of a DDR unit (e.g., the output of HDMI transmitter 33 of disk drive 4 of FIG. 6), and decrypts this data. HDCP logic 53 operates with receiver 54 and transmitter 52 to allow receiver 54 to execute HDCP authentication exchanges with the DDR unit, and to allow transmitter 52 to execute HDCP authentication exchanges with an HDMI receiver in monitor 2. The decrypted content output from receiver 54 can either be asserted directly to a second input of switch 51, or can be scaled in scaler 55 and the output of scaler 55 then asserted to a third input of switch 51. Switch 51 can be controlled to pass the data at any one of its inputs to HDMI transmitter 52. HDMI transmitter 52 performs HDCP encryption on the data passed by switch 51, and asserts the HDCP-encrypted data over an HDMI link to monitor 2.

Transmitter 52 need only perform HDCP encryption on data passed by switch 51 in the case that the data have reached switch 51 as a result of forwarding of HDCP-encrypted data from a DDR unit to HDMI receiver 54 and assertion of a decrypted version of such HDCP-encrypted data by receiver 54 to switch 51 (or by receiver 54 to scaler 55, and from scaler 55 to switch 51). Transmitter 52 need not perform HDCP encryption of data that have been asserted to switch 51 from GMCH chip 6 of FIG. 4 and passed by switch 51 to transmitter 52 (instead, transmitter 52 can send an unencrypted version of this data over the HDMI link to monitor 2).

Figure 9:
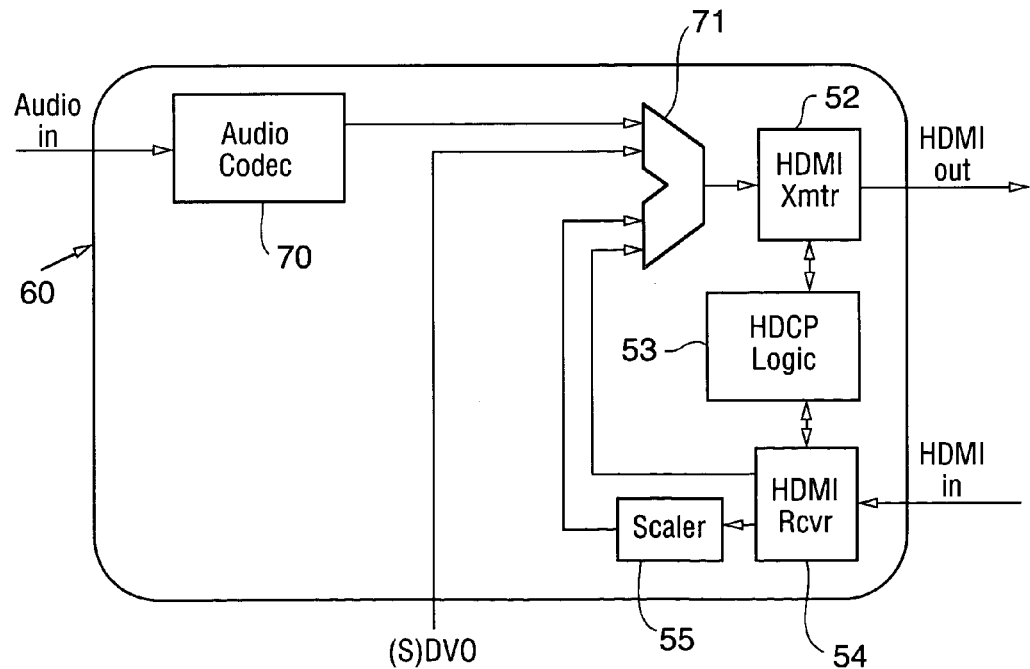
FIG. 9 is a block diagram of a substitute for card 10 of FIG. 4.

For another example, ADD card 60 of FIG. 9 (which can replace card 10 of FIG. 7 in the FIG. 4 system) includes HDCP logic 53, HDMI receiver 54, scaler 55, audio codec 70, switch 71, and HDMI transmitter 52, connected as shown. One input of switch 71 receives audio data output from codec 70 (which can be generated by codec 70 in response to data from GMCH chip 6 of FIG. 4). A second input of switch 71 receives video data output from GMCH chip 6 of FIG. 4. The data passed by switch 71 to HDMI transmitter 52 undergo HDCP encryption in transmitter 52, and the HDCP-encrypted data are asserted over an HDMI link to monitor 2. HDMI receiver 54 receives the output of the DDR unit (e.g., the output of HDMI transmitter 33 of disk drive 4 of FIG. 6), and decrypts this data. HDCP logic 53 operates with receiver 54 and transmitter 52 to allow receiver 54 to execute HDCP authentication exchanges with the DDR unit, and to allow transmitter 52 to execute HDCP authentication exchanges with an HDMI receiver in monitor 2. The decrypted content output from receiver 54 can either be asserted directly to a third input of switch 71, or can be scaled in scaler 55 and the output of scaler 55 then asserted to a fourth input of switch 71. Switch 71 can pass the data at any one of its inputs to HDMI transmitter 52.

Figure 10:
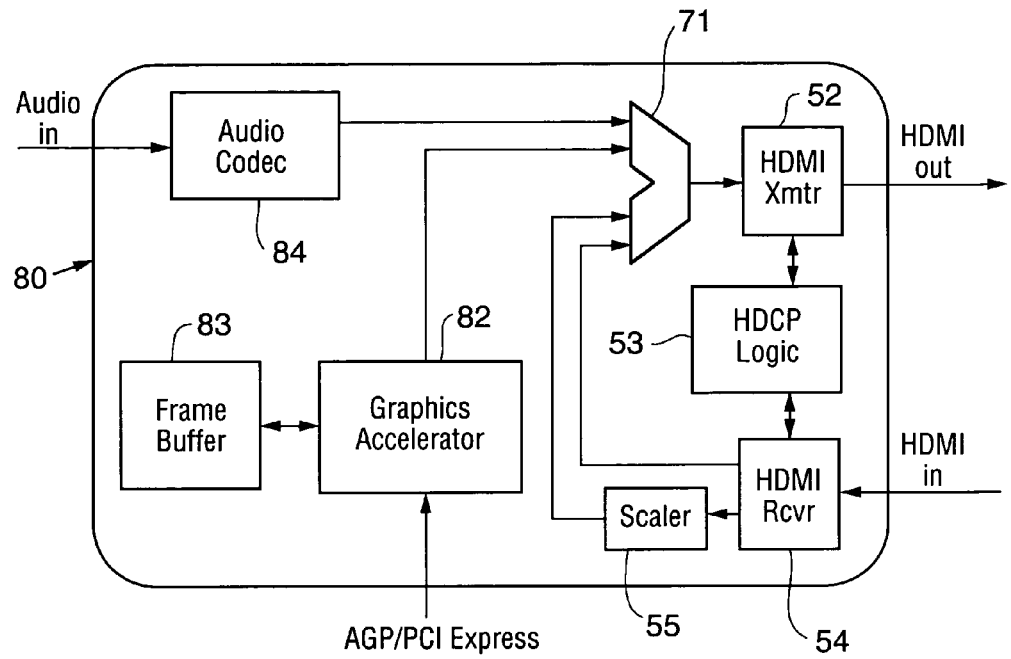
FIG. 10 is a block diagram of a substitute for card 20 in a variation on the FIG. 5 system.

For another example, media/graphics card 80 of FIG. 10 (which can replace card 20 in variation on the FIG. 5 system in which digital audio data are transmitted with digital video to the monitor, but no analog audio is output from the media/graphics card) includes HDCP logic 53, HDMI receiver 54, scaler 55, audio codec 84, graphics accelerator 82, frame buffer 83, switch 71, and HDMI transmitter 52, connected as shown. One input of switch 71 receives audio data output from codec 84 (which can be generated by codec 84 in response to data from GMCH chip 16 of FIG. 5). A second input of switch 71 receives video data output from graphics accelerator 82. Such video data are typically generated in accelerator 82 in response to data from GMCH chip 16 of FIG. 5, written to frame buffer 83, and then asserted from frame buffer to 83 to switch 71. The data passed by switch 71 to HDMI transmitter 52 undergo HDCP encryption in transmitter 52, and the HDCP-encrypted data are asserted over an HDMI link to monitor 2. HDMI receiver 54 receives the output of the DDR unit (e.g., the output of HDMI transmitter 33 of disk drive 4 of FIG. 6), and decrypts this data. HDCP logic 53 operates with receiver 54 and transmitter 52 to allow receiver 54 to execute HDCP authentication exchanges with the DDR unit, and to allow transmitter 52 to execute HDCP authentication exchanges with an HDMI receiver in monitor 2. The decrypted content output from receiver 54 can either be asserted directly to a third input of switch 71, or can be scaled in scaler 55 and the output of scaler 55 then asserted to a fourth input of switch 71. Switch 71 can pass the data at any one of its inputs to HDMI transmitter 52.

In another class of embodiments, multiplexer 31, decoder 32, HDMI transmitter 33, and SATA interface 34 of FIG. 6 are implemented as a closed subsystem of a PC, separate and independent of a DVD drive (the PC may not even include a DVD drive). For example, multiplexer 31 can be coupled to receive data that have been asserted to PC 1 from the internet. When multiplexer 31 detects that such data are non-protected content, multiplexer 31 asserts the data to SATA interface 34. Otherwise (e.g., when multiplexer 31 detects that the data from controller 30 are copyrighted content), multiplexer 31 asserts the data from controller 30 to decoder 32. Decoder 32 is configured to perform decryption and decompression of the data (which can be high definition video data, or other video data, for example). HDMI transmitter 33 re-encrypts the resulting raw data (e.g., raw video data) according to the HDCP protocol, and transmits the re-encrypted data over an HDMI link, e.g., directly to ADD card 10 (or a variation thereon) or to media/graphics card 20 (or a variation thereon). The DDR unit would preferably implement secure key exchange, expiration, and revocation mechanisms (e.g., such mechanisms could be implemented within HDMI transmitter 33).

In a variation on the example given in the previous paragraph, SATA interface 34 is replaced by a data interface of some other type (e.g., a PCI, ATA or SCSI interface). More generally, it is contemplated that a wide variety of data transmission interfaces can be employed in the many contemplated open systems that embody the invention, and in the many contemplated closed systems configured in accordance with the invention to be embedded in open systems. In some embodiments (e.g., variations on the embodiments described with reference to FIGS. 4 and 6 and the embodiments described below with reference to FIGS. 5, 12, and 13), the inventive open system employs a data interface other than a SATA interface to transfer non-protected data (or both protected and non-protected data) between elements thereof (e.g., from an HD-DVD drive or other disk drive to an I/O controller hub chip of a PC, where the open system is a PC). For example, in some embodiments of the inventive open system, the open system employs a PCI, ATA or SCSI interface (with appropriate connector) rather than a SATA interface (e.g., SATA interface 34 with connector 34A as shown in FIG. 6 or SATA interface 36 with connector 36A as shown in FIG. 13) to transfer non-protected data between elements thereof.

In the embodiments described in the second paragraph above, decoder 32 is preferably implemented as a secure decoder (within the DDR unit of the closed subsystem of the inventive open system), so that the DDR unit can be used to deliver Internet based content with the same degree of protection as local HD-DVD disks. In variations on such embodiments, encrypted and compressed data are provided (e.g., from the internet) to a DDR unit (which is implemented in a closed subsystem of a PC or other open system, but not within a DVD drive) via a SATA port of the DDR unit, and the DDR unit outputs only HDMI re-encrypted data (e.g., over an HDMI link).

For example, if a customer wanted to watch the latest popular movie (where "movie" is sometimes referred to herein as a "title"), the customer's decoder unit (within the DDR unit of the customer's open system) could be given a key, good for a limited time, that is used only once. Then a copy of the movie is sent over the internet, encrypted on the fly with that key. Only that user would be able to view the title, and only for the limited time. Even if the movie data were intercepted by someone else, or saved to a disk, it would be useless in any other decoder or at any time after the expiration of the key.

An alternative would to be for a distributor to have a key that is valid for a limited duration (e.g., a daily key) per title, and to encode one copy of each title with a new key each day (or other appropriate time period). Any users authorized to view the movie that day would be given the title and the appropriate key, along with an expiration time for the key. Once the time passed, any copies of that instance of the movie would be unplayable. The next day, a new version would be encrypted for that day's customers.

Figure 11:
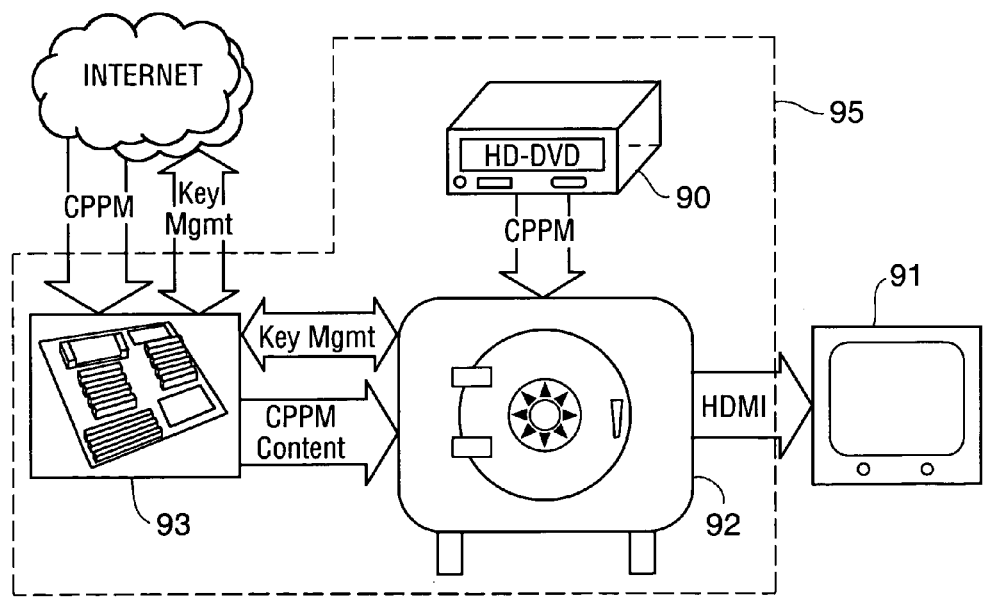
FIG. 11 is a block diagram of another embodiment of the invention.

The DDR unit of a closed subsystem of an open system could be used as a digital rights management hub within the home. For example, in FIG. 11, DDR unit 92 is included in a closed subsystem (of open computing system 95) that also includes HD-DVD drive 90 and interface circuitry 93. Encrypted, compressed high-definition video from drive 90 can be decrypted, decompressed, and re-encrypted (in accordance with HDCP) by DDR unit 92 and the re-encrypted data then transmitted from the open system to monitor 91 over an HDMI link. Similarly, encrypted content ("CPPM" data) can be asserted from the internet, via interface 93, to DDR unit 92. DDR unit 92 (via interface 93) implements any key exchange and verification operations needed to accomplish decryption of the CPPM data, and DDR unit 92 then decrypts (and decompresses if necessary) the data, and then re-encrypts the resulting data (preferably in accordance with HDCP). The re-encrypted data can then be transmitted from the open system to monitor 91 over the HDMI link. In essence, DDR unit 92 functions as a vault that can securely hold and use keys for a wide variety of uses. But, more than a vault, it contains the resources to convert between protected formats (e.g. HD-DVD and HDCP) inside the hub. The result of this is that neither the keys nor any unencrypted content are ever available for unauthorized use.

Over time, more formats and conversions can be added, as other forms of intellectual property need similar protection.

We next describe benefits that result from preferred embodiments of the invention.

In general, software decode (decryption and/or decompression) of media data has advantages over hardware decode when there are a wide variety of formats or when there are a rapidly changing set of formats. This situation is typical of the current world of streaming media available over the Internet for home PC's. There are many competing audio and video formats, and a user typically downloads a new copy of the decoder program when needed.

The general drawback of software decode is that it can consume a significant portion of the processing capability of a system. Because of variations in the processing speed and the application load between systems, a uniformly good presentation is not always possible.

However, when a format is standardized and becomes universal (for example CD and DVD formats) the advantages of software decode are minimal. Usually a special purpose decoder is less expensive than a modern PC processor, and the presentation quality can be guaranteed to be uniformly good. This is because, unlike on a PC, there can be no unexpected applications running on the special purpose decoder, The inventors expect that HD-DVD format will reach a penetration level where special purpose hardware will be appropriate, both for stand-alone consumer players and for PC peripherals.

As discussed earlier, another area where hardware decode is advantageous, is in maintaining intellectual property protection on the content. If software decode is used, both the keys and the decoded content will be present in plain-text in the PC's memory system. Since other applications can be running at the same time, malicious programs can compromise the protection system. In addition, home users usually have administrator rights on their systems, and can load "Trojan horse" device drivers or use other back-door attacks to gain access to the keys or content. Once the keys are compromised for a mass produced format, the content protection battle is essentially lost. In contrast, since a special purpose hardware decoder would not allow other programs to load and would only permit signed firmware updates, it would be virtually impossible to for all but the most sophisticated crackers to gain access.

The use of special purpose hardware would not preclude software decode of non copy-protected content, such as content that a consumer makes and trades with friends. Preferably, the inventive open system would treat the valuable intellectual property of content producers differently than home movies, etc. That is, the closed subsystem of the inventive open system would prevent consumer video editing software run by the open system from modifying copy-protected content.

Another aspect of the invention is a method for protecting content in a computing system having an open system architecture and providing the content to an external system. The method includes the steps of: (a) in a closed subsystem of the computing system, generating raw content by decrypting and optionally performing additional processing on encrypted content; (b) in the closed subsystem, generating protected content by re-encrypting the raw content; and (c) asserting the protected content from the closed subsystem to the external system without providing the computing subsystem access to the protected content. The encrypted content can be received from a source external to the computing system (e.g., via the internet). The encrypted content can be digital video data read from a disk. In some embodiments, step (a) includes the steps of decrypting the encrypted content to generate decrypted data, and performing decompression on the decrypted data to generate the raw content. In some embodiments, the digital video data are high-definition digital video data read from a disk, and step (a) includes the steps of decrypting the high-definition digital video data to generate decrypted data, and performing decompression on the decrypted data to generate raw content.

The expression that a first item "comprises" a second item is used herein (including in the claims) to denote that the first item is or includes the second item.

It should be understood that while some embodiments of the present invention are illustrated and described herein, the invention is defined by the claims and is not to be limited to the specific embodiments described and shown.

What is claimed is:

1. A method for content protection in an apparatus comprising:
    receiving encrypted data in the apparatus according to a first encryption protocol wherein the apparatus comprises:
        an open system architecture configured to allow end users to add or remove hardware components, software modules, or both;
        a closed subsystem of the apparatus to receive the encrypted data, wherein the closed subsystem does not allow end users to add hardware components or software modules thereto or remove hardware components or software modules therefrom; and
        combiner circuitry that may add unprotected graphics and audio data to raw data;
    generating raw data in a closed subsystem of the apparatus within the open system architecture, the raw data being generated in the closed subsystem by decrypting the encrypted data and performing additional processing on the encrypted data wherein the additional processing comprises:
        decompressing the encrypted data if compressed encrypted data is received;
        and manipulating the encrypted data for output;
    preventing access to the raw data outside of the closed subsystem;
    adding any applicable unprotected graphics and audio data to the raw data using the combiner circuitry;
    generating protected data in the closed subsystem by re-encrypting the raw data using a second encryption protocol to generate protected data with any added graphics and audio data; and
    asserting the protected data from the closed subsystem to an external device or system.

2. The method of claim 1, wherein the apparatus is an entertainment device.

3. The method of claim 1, wherein the encrypted data comprises digital video data.

4. The method of claim 3, wherein receiving encrypted data includes reading the digital video data from a disk.

5. The method of claim 3, wherein the digital video data comprises high-definition digital video data, and wherein re-encrypting the raw data includes re-encrypting the raw data in accordance with the HDCP (High-bandwidth Digital Data Protection) protocol.

6. The method of claim 1, wherein re-encrypting the raw data includes the use of key data, and further comprising preventing the key data from being disclosed outside of the closed subsystem except to the external device or system.

7. The method of claim 1, wherein the encrypted data is received from a source external to the apparatus.

8. The method of claim 7, wherein the source external to the apparatus is the Internet.

9. The method of claim 1, further comprising generating additional unprotected data and asserting the additional unprotected data to the closed system.

10. The method of claim 9, further comprising asserting the additional unprotected data from the closed system to the external device or system without encryption.

11. The method of claim 1, wherein the external device or system comprises a display device.

12. An apparatus comprising:
    an open system architecture configured to allow end users to add or remove hardware components, software modules, or both;
    combiner circuitry that may add unprotected graphics and audio data to raw data;
    a closed subsystem within the open system architecture wherein the closed subsystem does not allow end users to add hardware components or software modules thereto or remove hardware components or software modules therefrom, the closed subsystem configured to:
        receive encrypted data according to a first encryption protocol,
        decrypt and perform additional processing on the encrypted data to generate raw data wherein the additional processing comprises:
            decompressing the encrypted data if compressed encrypted data is received, and
            manipulating the encrypted data for output,
        add any applicable unprotected graphics and audio data to the raw data using the combiner circuitry, and
        re-encrypt the raw data to generate protected data usin a second encryption protocol to generate protected data with any added graphics and audio data,
    further wherein the closed system prevents access to the raw data outside of the closed subsystem; and
    an output, the closed subsystem to assert the protected data to an external device or system via the output.

13. The apparatus of claim 12, wherein the protected data comprises encrypted high-definition digital video data.

14. The apparatus of claim 12, further comprising a second subsystem configured to generate additional unprotected data and to assert the additional unprotected data to the closed subsystem.

15. The apparatus of claim 14, wherein the additional unprotected data comprises audiovisual data.

16. The apparatus of claim 14, wherein the additional unprotected data comprises menu information.

17. The apparatus of claim 14, wherein the closed subsystem is operable in a first mode to assert the protected data to the output and in a second to assert the additional unprotected data to the output.

18. The apparatus of claim 12, wherein the closed subsystem is operable to re-encrypt the raw data using key data.

19. The apparatus of claim 18, wherein the closed subsystem is operable to prevent release of the key data outside of the closed subsystem except to the external device or system.

20. The apparatus of claim 12, wherein the output includes one or more HDMI (Definition Multimedia Interface) compatible links from the apparatus to the external device or system.

21. The apparatus of claim 12, wherein the closed subsystem comprises an HD-DVD drive configured to decrypt high-definition digital video read from a disk to generate decrypted data, to perform decompression on the decrypted data to generate raw data, and to generate the protected data by re-encrypting the raw data.

22. The apparatus of claim 12, wherein the closed subsystem is configured to re-encrypt the raw data in accordance with the HDCP (High-bandwidth Digital Data Protection) protocol.

23. The apparatus of claim 12, wherein the apparatus is configured to communicate bidirectionally with the external device or system to execute an authentication protocol the prior to assertion of the re-encrypted data to the external device or system.

24. The apparatus of claim 23, wherein the apparatus executing the authentication protocol includes verifying that the external device or system is authorized to receive the protected data and to establish shared secret values for use in encryption and decryption of data.

25. The apparatus of claim 12, wherein the apparatus is an entertainment device.

26. The apparatus of claim 14, wherein the closed subsystem is to re-encrypt the raw data using key data, and is to prevent release of the key data outside of the closed subsystem except to the external device or system.

27. The apparatus of claim 14, wherein the apparatus is configured to communicate bidirectionally with the external device or system to execute an authentication protocol the prior to assertion of the re-encrypted data to the external device or system.

28. The apparatus of claim 27, wherein the apparatus executing the authentication protocol includes verifying that the external device or system is authorized to receive the protected data and to establish shared secret values for use in encryption and decryption of data.

29. A system comprising:
a first apparatus with an open system architecture configured to allow end users to add or remove hardware components, software modules, or both, the first apparatus including combiner circuitry that may add unprotected graphics and audio data to raw data, a closed subsystem within the open system architecture wherein the closed subsystem does not allow end users to add hardware components or software modules thereto or remove hardware components or software modules therefrom, the closed subsystem configured to
receive encrypted content according to a first encryption protocol,
decrypt and perform additional processing on the encrypted data to generate raw data wherein the additional processing comprises:
decompressing the encrypted data if compressed encrypted data is received, and
manipulating the encrypted data for output,
add any applicable unprotected graphics and audio data to the raw data using the combiner circuitry,
re-encrypt the raw content to generate protected content using a second encryption protocol to generate protected data with any added graphics and audio data, and
transmit the protected data via an output, the closed system preventing access to the raw content outside of the closed subsystem; and
a second apparatus including an input to receive the protected content and decryption circuitry to generate raw content by decrypting the encrypted video data.

30. The system of claim 29, wherein the protected content comprises encrypted high-definition digital video data.

31. The system of claim 30, wherein the second apparatus includes a digital video monitor.

32. The system of claim 29, wherein the closed subsystem is configured to receive the encrypted content from a remote source.

33. The system of claim 29, wherein the closed subsystem is further to perform decompression on the decrypted data in the generation of the raw content.

* * * * *